(12) United States Patent
Van Veldhuisen

(10) Patent No.: US 12,075,033 B2
(45) Date of Patent: Aug. 27, 2024

(54) RESTRUCTURING TECHNIQUE FOR VIDEO FRAMES

(71) Applicant: ARRIS Enterprises LLC, Suwanee, GA (US)

(72) Inventor: Brenda L. Van Veldhuisen, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 94 days.

(21) Appl. No.: 17/851,726

(22) Filed: Jun. 28, 2022

(65) Prior Publication Data

US 2022/0417505 A1 Dec. 29, 2022

Related U.S. Application Data

(60) Provisional application No. 63/215,854, filed on Jun. 28, 2021.

(51) Int. Cl.
| | |
|---|---|
| *H04L 27/04* | (2006.01) |
| *G06V 20/40* | (2022.01) |
| *H04N 19/114* | (2014.01) |
| *H04N 19/159* | (2014.01) |
| *H04N 19/172* | (2014.01) |

(52) U.S. Cl.
CPC ........... *H04N 19/114* (2014.11); *G06V 20/41* (2022.01); *H04N 19/159* (2014.11); *H04N 19/172* (2014.11)

(58) Field of Classification Search
CPC .. H04N 19/114; H04N 19/159; H04N 19/172; G06V 20/41
USPC ................ 375/314, 312, 310, 219, 295, 316
See application file for complete search history.

(56) References Cited

U.S. PATENT DOCUMENTS

| | | | |
|---|---|---|---|
| 2007/0217339 A1* | 9/2007 | Zhao | ................... H04N 21/6377 375/E7.029 |
| 2009/0161766 A1 | 6/2009 | Bronstein et al. | |
| 2010/0329340 A1 | 12/2010 | Nemiroff et al. | |
| 2013/0003839 A1* | 1/2013 | Gao | ....................... H04N 19/46 375/E7.243 |

FOREIGN PATENT DOCUMENTS

JP     H07322265 A     12/1995

OTHER PUBLICATIONS

International Search Report and Written Opinion RE: Application No. PCT/US2022/035319, dated Oct. 10, 2022.

* cited by examiner

*Primary Examiner* — Zewdu A Kassa
(74) *Attorney, Agent, or Firm* — Chernoff, Vilhauer, McClung & Stenzel, LLP

(57) ABSTRACT

A system for restructuring video frames.

5 Claims, 5 Drawing Sheets

$F_x$ = ORIGINAL FRAME IN SEGMENTAL SERVICES $R_x$ = REPEAT FRAME OF $F_x$

RESTRUCTURING TECHNIQUE FOR VIDEO FRAMES

CROSS REFERENCE TO RELATED APPLICATIONS

This application claims the benefit of U.S. Provisional Patent Application Ser. No. 63/215,854 filed Jun. 28, 2021.

BACKGROUND

The subject matter of this application relates to a restructuring technique for video frames.

Referring to FIG. 1, a compressed bitstream from a storage device or transmission channel 100 is input to a decoder buffer 110 which is connected over a communication link 120 to a decoder 130, the output 140 of which is displayed 150.

Referring to FIG. 2, a video compression system receives an input video stream 200 that is provided as a first input to a picture coder 210 and as an input to a complexity estimator 220. The complexity estimator outputs an estimate 230 that is an input to a picture bit allocator 240 whose output 250 produces a second input to the picture coder 210. The picture coder 210 operates on the first input 200, under control of the number of bits allocated as indicated by the output 250, to produce a coded output 260 for the compressed bitstream.

Digital video compression techniques are widely used in many applications to reduce the storage and transmission bandwidth requirements. The dominant digital video compression techniques are specified by the international standards MPEG-1 (ISO/IEC 11718-2), MPEG-2 (ISO/IEC 13818-2), MPEG-4 (ISO/IEC JTC1/SC29/WG11), Advanced Video Coding (AVC) H.264 Series H: Audiovisual and Multimedia Systems (June 2019), developed by the Moving Picture Experts Group (MPEG), part of a joint technical committee of the International Standards Organization (ISO) and the International Electrotechnical Commission (IEC), each of which is incorporated by reference herein. These standards were developed for coding of motion pictures and associated audio signals for a wide range of applications involving the transmission and storage of compressed digital video, including video streaming, video distribution on demand, digital television transmission via coaxial networks, fiber-optic networks, terrestrial broadcast or direct satellite broadcast; and for interactive multimedia contents stored on a storage media.

The MPEG standards specify a bitstream in which a variable number of bits are used to represent each compressed picture. The variable feature is due to the different types of picture processing, as well as the inherent variation with spatio-temporal complexity of the scene being coded. This leads to the use of buffers to smooth out the fluctuations in the bitrate. For a constant-bit-rate storage media or transmission channel buffering allows the bitrate of the compressed pictures to vary within limits that depend on the size of the buffers, while outputting a constant bitrate to the storage device or transmission channel.

Referring to FIG. 3, an example is illustrated of the three types of encoded frames (e.g., pictures) I, P, B within a group of frames that form a sequence of frames of a set of compressed MPEG frames. The principal distinguishing feature among the frame types is the compression method which is used. The first type, Intra-mode frames or I frames, are compressed independently of any other frames. Although there are no fixed upper bound on the distance between I frames, often they are interspersed frequently throughout a sequence to facilitate random access and other special modes of operation. Predictively motion-compensated frames (P frames) are reconstructed from the compressed data in that frame and from the previous I or P frame. Bidirectionally motion-compensated frames (B frames) are reconstructed from the compressed data in that picture plus a previous I or P frame and a subsequent I or P frame. Because reconstructed I or P frames can be used to reconstruct other frames, they are called reference pictures.

MPEG pictures are constructed from macroblocks that are coded based upon a macroblock quantizer parameter that acts as the primary manner of trading off quality versus bitrate in MPEG-2. The quantizer parameter can vary from macroblock to macroblock within a frame. The macroblock quantizer is computed in any suitable manner. Most video sequences exhibit a high degree of correlation between consecutive pictures. A useful method to remove this redundancy before coding a picture is motion compensation.

The MPEG standards can be used with both constant-bit-rate and variable-bit-rate transmission and storage media. The number of bits in each picture will be variable, due to the different types of picture processing, as well as the inherent variation of the spatio-temporal complexity of the scene being coded.

For the bitstream to satisfy the MPEG rate control requirements, all the data for each frame needs to be available within the buffer at the instant it is needed by the decoder and that the decoder buffer does not overfill. These requirements translate to upper and lower bounds on the number of bits allowed in each frame. The upper and lower bounds for a given frame depend on the number of bits used in the frames preceding it.

Video transcoding is a process of converting one compressed video stream to another compressed video stream. Video transcoding techniques are widely used in various applications. There are two primary advantages to applying transcoding techniques to video streaming. First, by storing a high quality compressed video stream (rather than the raw video file), a substantial amount of storage space in the server can be saved. Second, by reusing a part of the compressed video information carried in the source video stream, the transcoding process can be greatly simplified in comparison with the traditional encoding process. Video transcoding among various bitrates (e.g. from DVD high quality video to wireless low quality video) uses rate control to satisfy the bandwidth, buffer, and delay constraints, etc.

Generally speaking, video transcoders may be classified into three types. Referring to FIG. 4A, the transcoder may re-quantize DCT coefficients of the input bitstream by a bigger quantization step size and thus lower quality. Consequently, the complexity of the transcoder is relatively low. However, drift errors can occur in P and B frames and accumulate in P frames until the next I frame is transcoded.

Referring to FIG. 4C, the transcoder may cascade a full decoder with a full encoder. Because motions are re-estimated and residues are recalculated in the transcoder, drift errors can be eliminated. However, this results in high computational complexity, and is not normally suitable for low complexity or real-time applications.

Referring to FIG. 4B, to compromise the quality and the complexity, a transcoder may recalculate residues based on the previous transcoded frame, drift errors can be avoided and the final reconstruction error depends on the quantization noise. Thus, the transcoder results in relatively high quality transcoded video. The complexity of the transcoder of FIG. 4B is higher than that of FIG. 4A due to the IDCT/MCP/DCT (inverse discrete cosine transform/motion compensated picture/discrete cosine transform) operations. However, the transcoder is significantly less complex than that of FIG. 4C, since it re-uses the motion information carried by the input bitstream instead of processing motion re-estimation. Hence, the transcoder provides relatively high quality and relatively low complexity.

Unfortunately, some transcoded video streams tend to have difficulty in maintaining the encoding quality with a desired maximum bitrate.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
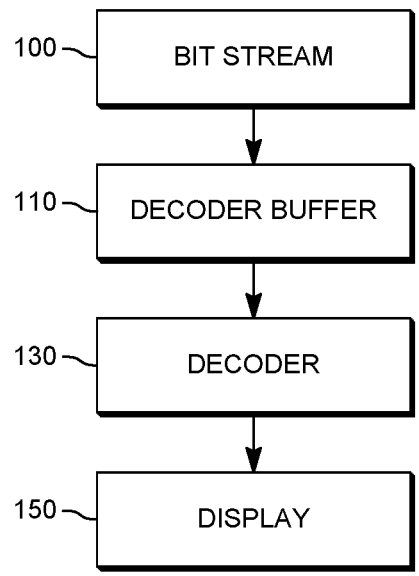
FIG. 1 illustrates decoding a bitstream that includes video.
Figure 2:
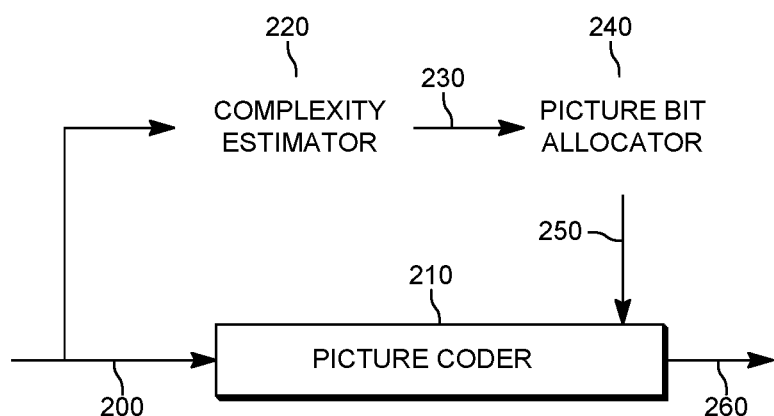
FIG. 2 illustrates a picture coder based upon bit allocation.
Figure 3:
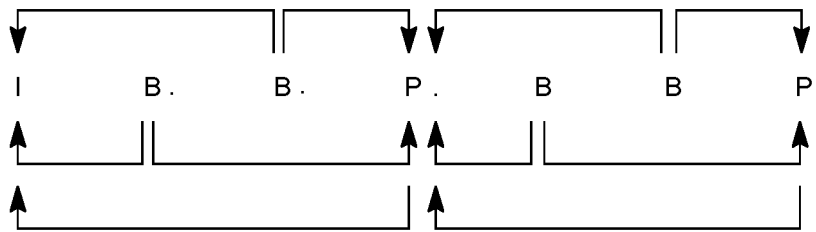
FIG. 3 illustrates I, P, and B frames and references between them.
Figure 4A:
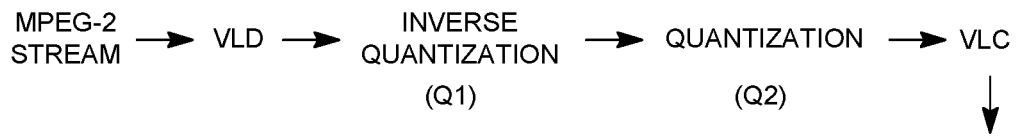
FIGS. 4A-4C illustrate transcoders.
Figure 4B:
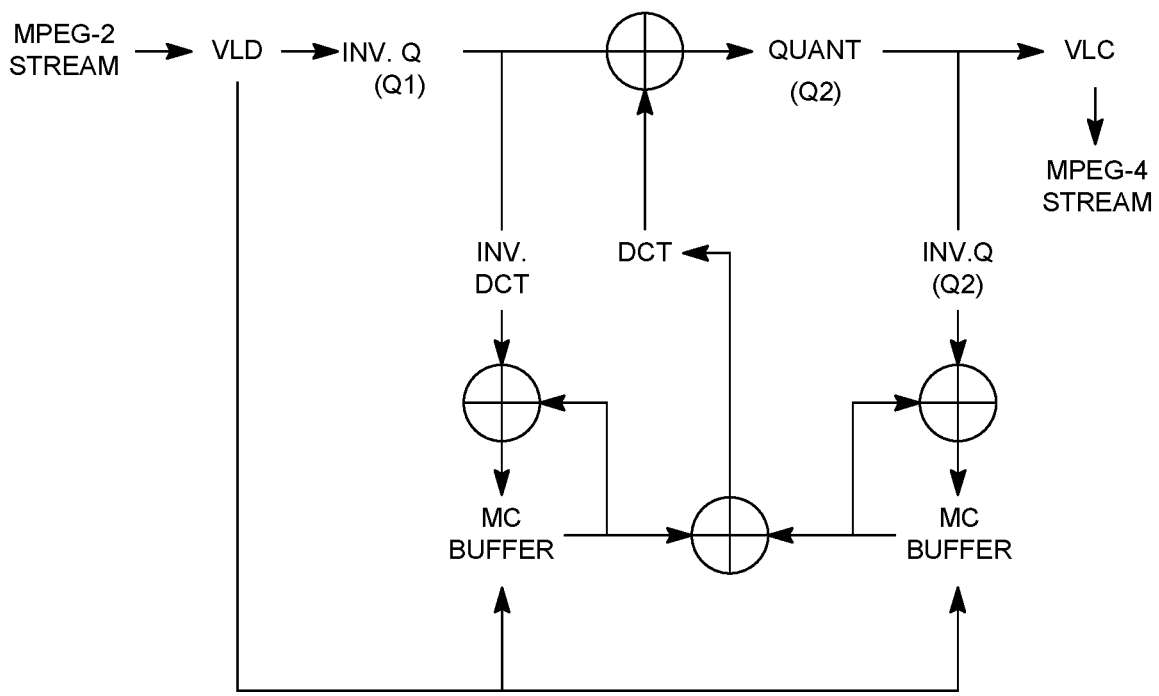
Figure 4C:
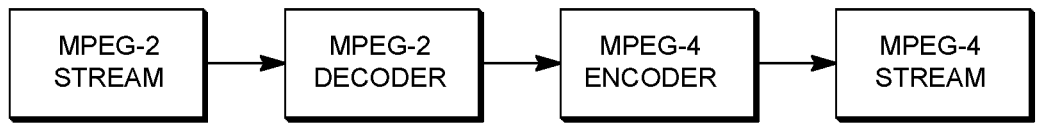
Figure 5:
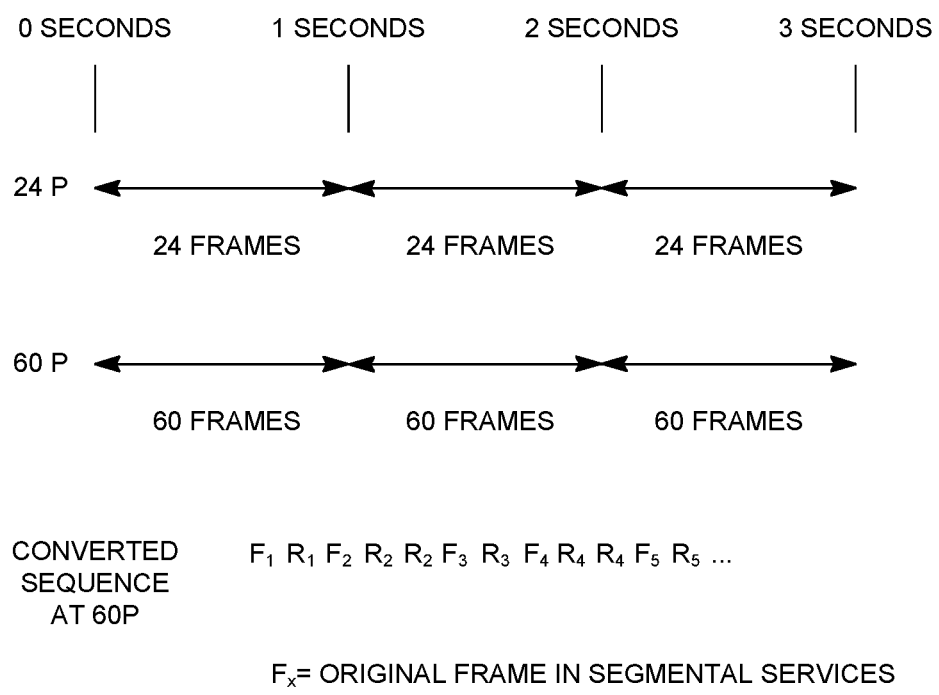
FIG. 5 illustrates 24P to 60P conversion including repeating frames.

Referring to FIG. 5, typically motion pictures have a frame rate of 24 progressive frames per second. However, it many cases the motion pictures having a frame rate of 24 progressive frames per second is transcoded to 60 progressive frames per second or 60 interlaced fields per second (generally referred to herein as frames for simplicity). To convert the 24P content to the 60P content, a pulldown is typically used to convert the 24 frames into 60 frames. This pulldown may be performed by taking every other frame and repeating it twice, and then taking the other frames and repeating them trice. The result is a repeating pattern of 2 frames, 3 frames, 2 frames. 3 frames, 2 frames, 3 frames, 2 frames, 3 frames. 2 frames, 3 frames, etc. By way of example, for 1 second of video there may be 24 original frames and 36 repeat frames.

Figure 6:
FIG. 6 illustrates pattern recognition for frames of the video.

Referring to FIG. 6, when transcoding video content that is received that has been previously converted from 24P video content, such as in an encoded bitstream, it would be expected that the repeat frames would be properly signaled within the bitstream as repeat frames, so that no encoded bits are required to encode the pixels of the repeat frame. Unfortunately, over time and likely as a result of multiple entities encoding, multiple entities modifying, ticker overlays, and other modifications, the repeat frames are not properly identified as repeat frames, but rather, are often encoded in a manner that may require a substantial number of bits to encode the pixels of the frame. By way of example, all of the frames may be encoded with I, P, and B frames each of which encodes the pixels of the frames, some of which may use motion vectors to reference other frames. A pattern recognition process may be used to compare the frames with one another to identify whether a pull down process was used, and if used, the frames corresponding to the repeat frames.

Figure 7:
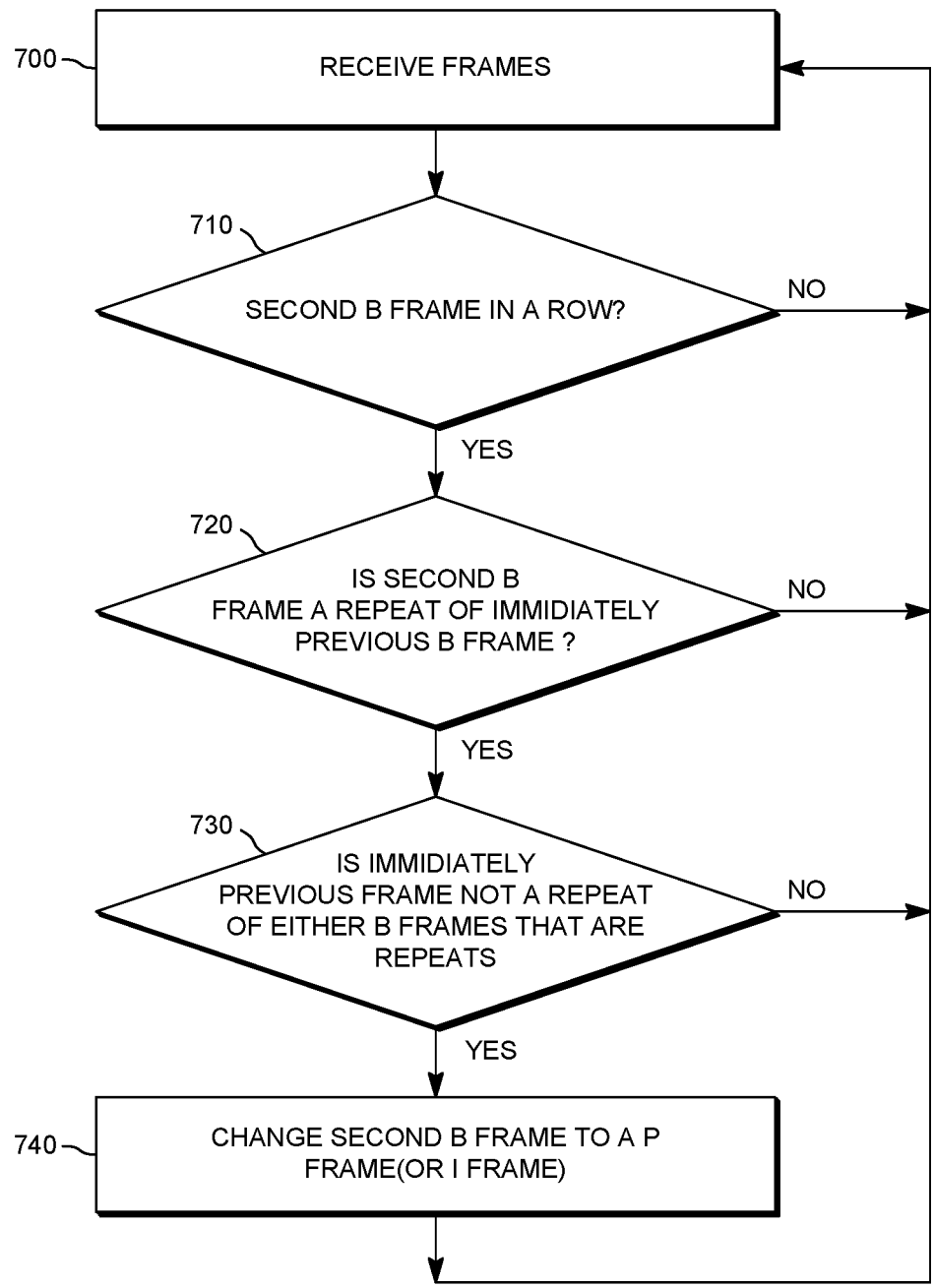
FIG. 7 illustrates selection frame type modification based upon repeat patterns.
Figure 8:
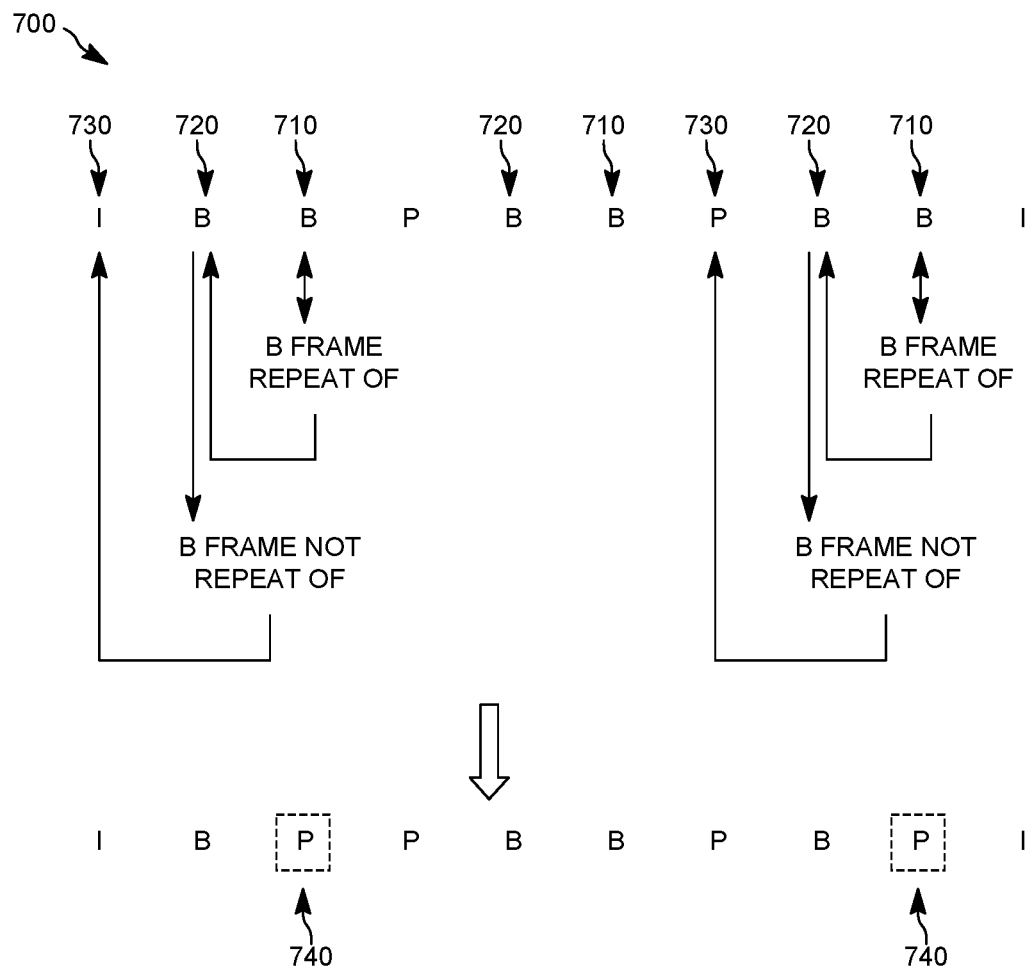
FIG. 8 illustrates selection frame type modification based upon repeat patterns.

Referring to FIG. 7 and FIG. 8, one technique to code the video stream is to use the output of the pattern recognition to determine the pattern of the pull down frames, such as 2 frames, 3 frames, 2 frames, 3 frames, etc., of the received frames 700. With the repeating pattern of the frames determined, it is desirable to code the bitstream using a repeating pattern of a group of pictures, such as I, B, B, P, B, B, P, B, B, P, B, B, I, etc. The group of pictures may be defined as the group of pictures between a sequential series of I frames, inclusive of the initial I frame. However, it was determined that with the repeating frames as a result of the pull down conversion that previously occurred, there exists situations where a second B frame is a repeat of only an immediately previous B frame but is not permitted to reference a previous B frame. When this pattern occurs the selection of the types of frames of the group of pictures is unsuitable for efficient encoding because the second B frame will need to be encoded using a substantial number of bits because it cannot be encoded as a repeat of the previous B frame. However, it is noted that the second B frame may reference a previous P frame or I frame, which may be desirable if the second B frame is a repeat of such a previous P frame or I frame. Accordingly, a technique is desirable so that the frame represented by the second B frame may be encoded with 'zero' bits for encoding the pixels of the frame (there may be bits used for overhead signaling of a repeat frame). Moreover, if a pair of sequential B pictures have substantially different number of bits required for encoding that are not otherwise marked as duplicates, a rate control mechanism that is not sufficiently forward looking tends to degrade the quality of the images around the sequential B frames.

The system initially checks if the current frame is a second B frame in a sequential series of frames 710. If the current frame is the second B frame in the sequential series of frames 710, then the system checks if the second B frame is a repeat frame of the immediately previously B frame 720. In this manner, the system has determined that the pair of B frames are repeat frames of one another. Next, the system checks to determine if the immediately previously frame to the pair of B frames is not a repeat of either of the B frames that are repeats of one another 730. In the case that the previous frame to the pair of B frames is a repeat of either of the B frames that are repeats of one another 730, then the system preferably codes the second B frame (which is not permitted to reference another B frame) as a repeat of the immediately previous frame (e.g., P or I frame) of the pair of B frames. In this manner, the coding efficiency is increased and the rate control of the transcoder is likely to be more effective. In the case that the immediately previous frame to the pair of B frames is not a repeat of either of the B frames that are repeats of one another 730, then the system preferably promotes the second B frame (which is not permitted to reference another B frame) to a P frame (or I frame) and referenced as a repeat of the first previous I or P frame (P frames are permitted to reference another P or I frame) 740.

A similar process may be used for source content that is coded with AVC where a typical pattern include P, B, $B_{ref}$, B, P, B, $B_{ref}$, B, P, B, $B_{ref}$, B, where $B_{ref}$ can be referenced by the other B frames. By way of example if $B_{ref}$ is a second B frame, and it is a repeat of the immediately preceding B frame, which is not a repeat of the previous frame (aka P frame) then the $B_{ref}$ is promoted to a P frame. In a similar manner, if the third B frame is a repeat of the immediately previous $B_{ref}$ frame, then the third B frame is promoted to a P frame.

A similar process may be used for source content that originates with 30P content that is converted to 60P content by repeating each frame once. If the system determines this is the pattern that occurred, then preferably the sequence is modified to include I, P, B, P, B, P, B, P, B, I. In this manner each of the B frames may reference the previous P frame, and be signaled as a 'repeat frame' thus increasing the coding efficiency.

It is noted that in many cases, the input frames are HEVC or AVC with a relatively high quality with an output that is AVC or MPEG-2 with a relatively lower quality.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

I claim:

1. A method encoding video into a bitstream comprising:
   (a) receiving said video comprising a plurality of I frames, B frames, and P frames, where said I frames are each intra coded frames, where said P frames are each forward predicted frames, and said B frames are each bi-directionally predicted frames;
   (b) determining whether one of said B frames is a repeat frame of an immediately preceding B frame of said encoded video;
   (c) determining whether said immediately preceding B frame of said encoded video is a repeat from of an immediately preceding frame to said immediately preceding B frame;
   (d) promoting said one of said B frames to either a P frame or an I frame if
      (i) said one of said B frames is a repeat frame of said immediately preceding B frame of said encoded video; and
      (ii) said immediately preceding B frame of said encoded video is not a repeat of said immediately preceding frame to said immediately preceding B frame;
   (e) encoding said video into said bitstream including said I frames, said B frames, and said P frames.

2. The method of claim 1 further comprising a pattern recognition process determining whether said video includes a repeating pattern of repeating frames having a sequence of 2 repeats and 3 repeats.

3. The method of claim 1 further comprising said promoting said one of said B frames to either said P frame or said I frame is said P frame.

4. The method of claim 3 wherein said promoted P frame is coded as a repeat frame of a previous frame.

5. A method encoding video into a bitstream comprising:
   (a) receiving said video comprising a plurality of I frames, B frames, and P frames, where said I frames are each intra coded frames, where said P frames are each forward predicted frames, and said B frames are each bi-directionally predicted frames;
   (b) determining whether a sequence of pairs of frames are repeats of one another;
   (c) coding said sequence of pairs of frames based upon said determining as a sequence of pairs of P frames and B frames, where each of said B frames is coded as a repeat frame of a corresponding P frame;
   (d) encoding said video into said bitstream including said I frames, said B frames, and said P frames.

* * * * *